United States Patent [19]

Motani et al.

[11] Patent Number: 5,789,462

[45] Date of Patent: Aug. 4, 1998

[54] PHOTOCURED CROSSLINKED-HYALURONIC ACID CONTACT LENS

[75] Inventors: Yoshihiro Motani; Satoshi Miyauchi, both of Tokyo, Japan

[73] Assignee: Seikagaku Kogyo Kabushiki Kaisha (Seikagaku Corporation), Tokyo, Japan

[21] Appl. No.: 712,515

[22] Filed: Sep. 13, 1996

[30] Foreign Application Priority Data

Sep. 13, 1995 [JP] Japan .................. 7-260682

[51] Int. Cl.$^6$ .................. G02C 7/04; C08F 290/10
[52] U.S. Cl. .................. 523/106; 351/160 H; 536/55.2; 526/238.23; 525/54.23; 525/54.32
[58] Field of Search .................. 523/106; 536/55.2; 526/238.23; 525/54.23, 54.32; 351/160 H

[56] References Cited

U.S. PATENT DOCUMENTS

| | | | |
|---|---|---|---|
| 4,223,984 | 9/1980 | Miyata et al. | 351/160 |
| 4,260,228 | 4/1981 | Miyata | 351/160 |
| 4,264,155 | 4/1981 | Miyata | 351/160 |
| 4,532,267 | 7/1985 | Allan | 523/106 |
| 5,143,731 | 9/1992 | Viegas et al. | 424/486 |
| 5,277,911 | 1/1994 | Viegas et al. | 424/427 |
| 5,376,693 | 12/1994 | Viegas et al. | 523/106 |
| 5,462,976 | 10/1995 | Matsuda et al. | 522/79 |
| 5,510,418 | 4/1996 | Rhee et al. | 525/54.23 |
| 5,527,925 | 6/1996 | Chabracek et al. | 523/106 |

FOREIGN PATENT DOCUMENTS

| | | | |
|---|---|---|---|
| 0 193 510 A1 | 2/1986 | European Pat. Off. | C08B 37/08 |
| 0 486 294 A2 | 11/1991 | European Pat. Off. | C08L 5/08 |
| 0554898 | 8/1993 | European Pat. Off. | |
| 0713859 | 5/1996 | European Pat. Off. | |
| 51-11139 | 4/1976 | Japan | C08L 29/04 |
| 56-94322 | 7/1981 | Japan | G02C 7/04 |
| 63-50816 | 3/1988 | Japan | G02C 7/04 |
| 1-238530 | 9/1989 | Japan | A61K 31/725 |
| 1-279836 | 11/1989 | Japan | A61K 37/04 |
| 4-176459 | 6/1992 | Japan | A61F 9/04 |
| 5-93889 | 4/1993 | Japan | G02C 7/04 |
| 5-163384 | 6/1993 | Japan | C08L 5/00 |
| 5-313105 | 11/1993 | Japan | G02C 7/04 |
| 2 176795 | 1/1987 | United Kingdom | C08B 37/00 |
| WO 86/00079 | 1/1986 | WIPO | C08B 37/08 |
| 9525287 | 9/1995 | WIPO | |
| WO 95/25287 | 9/1995 | WIPO | G02B 1/04 |

OTHER PUBLICATIONS

Hiroshi Nakao et al., Folia Opthalmologica Japonica, 45(5), 484–489 (1994).

Primary Examiner—Andrew E. C. Merriam
Attorney, Agent, or Firm—Sughrue, Mion, Zinn, Macpeak & Seas, PLLC

[57] ABSTRACT

A photocured crosslinked-hyaluronic acid contact lens which comprises a photocured crosslinked-hyaluronic acid derivative produced by the formation of a crosslinked cyclobutane ring by light irradiation from mutual photoreactive crosslinking groups of a photoreactive hyaluronic acid derivative in which the photoreactive crosslinking groups are linked to hyaluronic acid, wherein the photoreactive crosslinking groups are introduced into functional groups of hyaluronic acid via a spacer group, and the contact lens has a water content of 80 to 99% and shape compatibility and tissue affinity for the eyeball. A process for preparing a photocured crosslinked-hyaluronic acid contact lens which comprises molding the photoreactive hyaluronic acid derivative into a shape that fits to the eyeball, and subsequently irradiating the shaped product with light to effect crosslinking between the mutual photoreactive crosslinking groups.

15 Claims, 7 Drawing Sheets

PHOTOCURED CROSSLINKED-HYALURONIC ACID CONTACT LENS

FIELD OF THE INVENTION

The present invention relates to contact lenses comprising a photocured crosslinked-hyaluronic acid derivative. Particularly, the present invention relates to contact lenses which have hyaluronic acid itself-inherent tissue affinity and hold high water holding property.

BACKGROUND OF THE INVENTION

Contact lenses (CL) are roughly divided into hard contact lenses (HCL) and soft contact lenses (SCL) depending on the flexibility of their materials. With regard to HCL, those materials which are possessed of high oxygen permeability and therefore can be worn continuously have been developed. With regard to SCL, on the other hand, hydrous high polymers are used, and those materials which are possessed of oxygen permeability have also been developed. However, with the increasing demand for continuous wearing of CL for a prolonged period of time and development of contact lenses for therapeutic use, great concern has been directed toward the use of materials having higher tissue affinity and compatibility, and moreover higher oxygen permeability.

Collagen has been known as a CL material which aims at tissue affinity (JP-B-62-42487 (the term "JP-B" as used herein means an "examined Japanese patent publication"), U.S. Pat. Nos. 4,223,984, 4,260,228 and 4,264,155), and such a type of CL has been put into practical use as collagen lenses (manufactured by Bausch & Lomb, U.S.A.). Also, JP-B-62-42487 discloses CL which is molded after mixing collagen with mucopolysaccharide (glycosaminoglycan) such as chondroitin sulfate or the like. However, since collagen is a protein, it has a disadvantage of possessing antigenicity. Furthermore, since the eye is highly sensitive to foreign substances, it is apt to cause inflammations especially when the substances have antigenicity.

As another raw materials of CL and the like materials to be worn on the eyeball, a raw material in which acidic polysaccharide such as chondroitin sulfate or the like is included in a gel that is comprised of polyvinyl alcohol as its skeletal material (JP-B-51-11139), chitin or chitosan (e.g., JP-A-56-94322 (the term "JP-A" as used herein means an "unexamined published Japanese patent application"), JP-W-61-501729 (the term "JP-W" as used herein means an "unexamined published Japanese international patent application"), U.S. Pat. No. 4,532,267, JP-A-63-50816, JP-A-176459, JP-A-275346, EP-A2-486,294), glucomannan JP-A-5-163384), silk fibroin (JP-A-5-313105) and the like have been know. But the main raw material thereof is not a component of biological materials (vertebrate) origin and therefore has a problem in terms of tissue compatibility. Although there is a material which contains a glycosaminoglycan as a raw material of CL, there is no CL which is substantially composed of a glycosaminoglycan, particularly of only hyaluronic acid.

An attempt has been made to prepare a contact lens by introducing cinnamic acid into hydroxyl groups of hyaluronic acid through an ester bond and making use of the property of the product to be crosslinked and hardened by irradiation with ultraviolet rays (*Nippon Ganka Kiyo* (Japan Ophthalmology Bulletin, (45, 484–489, 1994). This attempt was conducted prior to the studies of the present invention, and became base of the present invention, but this photocured crosslinked-hyaluronic acid contact lens was high in cinnamic acid-introducing ratio in which one or more cinnamic acid molecules were introduced per one repeating disaccharide unit of hyaluronic acid (four cinnamic acid molecules can be introduced at maximum per repeating disaccharide unit of hyaluronic acid), so that its water holding property was low, it was HCL-like in shape and physical properties, and it therefore was suited for use as visual acuity correcting CL rather than therapeutic CL. However, its application has a limitation, because its shape stability is reduced and it becomes water soluble when the cinnamic acid-introducing ratio is reduced in order to improve water holding property of the photocured crosslinked-hyaluronic acid contact lens.

The conventional photocured crosslinked-hyaluronic acid contact lens described in the above reference mostly has the following properties.

TABLE 1

| Degree of cinnamic acid substitution (substituted numbers per disaccharide unit) | 1.7 | 2.9 |
| --- | --- | --- |
| Degree of cinnamic acid substitution (mole % per disaccharide unit) | 170% | 290% |
| Water content | 11.3% | 6.4% |
| Linear swelling ratio | 3.1% | 2.1% |
| Contact angle | 32.2° | 40.1° |

In view of the above, it was necessary to develop the raw material itself prior to the development of a hyaluronic acid-based contact lens which has high water holding property and high oxygen permeability, and is in an SCL shape and physical properties rich in flexibility, so that it can also be used as CL for therapeutic use.

SUMMARY OF THE INVENTION

First object of the present invention is to provide a photocured crosslinked-hyaluronic acid contact lens which is excellent in bioaffinity, biocompatibility and shape compatibility with eyeball and has markedly high water holding property and oxygen permeability.

Second object of the present invention is to provide a contact lens which comprises a crosslinked hyaluronic acid derivative obtained by photocrosslinking a photoreactive hyaluronic acid derivative into which a photoreactive crosslinking group having a spacer structure is introduced, which is effective for achieving the first object.

Third object of the present invention is to provide these contact lenses as contact lenses for therapeutic use, cornea-protecting materials (corneal bandage, corneal shield), ultraviolet ray-protecting contact lenses, controlled drug release contact lenses and visual acuity-correcting contact lenses.

As a result of intensive studies, the inventors of the present invention have succeeded in achieving the above objects based on the following construction.

(1) A photocured crosslinked-hyaluronic acid contact lens which comprises a photocured crosslinked-hyaluronic acid derivative produced by the formation of a crosslinked cyclobutane ring by light irradiation from mutual photoreactive crosslinking groups of a photoreactive hyaluronic acid derivative in which said photoreactive crosslinking groups are linked to a hyaluronic acid, wherein said photoreactive crosslinking groups are introduced into functional groups of hyaluronic acid via a spacer group, and said contact lens has a water content of 80 to 99% and shape compatibility and tissue affinity for the eyeball.

(2) The photocured crosslinked-hyaluronic acid contact lens according to the above item (1) wherein oxygen permeability coefficient (Dk value) of said contact lens is $40 \times 10^{-11}$ to $100 \times 10^{-11}$ (cm$^2$/sec)·(ml O$_2$/ml·mmHg).

(3) The photocured crosslinked-hyaluronic acid contact lens according to the above item (1) wherein said photoreactive crosslinking group is derived from cinnamic acid or a derivative thereof; said photoreactive hyaluronic acid derivative is formed by introducing the photoreactive crosslinking group into hyaluronic acid through binding of a functional group of hyaluronic acid with a photoreactive crosslinking group-linked spacer group in which said photoreactive crosslinking group and one functional group of a spacer compound having at least two functional groups are linked together; the functional group of the spacer group to be linked to hyaluronic acid is an amino group; and the photoreactive crosslinking group-linked spacer group is introduced into hyaluronic acid to form said photoreactive hyaluronic acid derivative by forming an amide bond with a carboxyl group of hyaluronic acid.

(4) The photocured crosslinked-hyaluronic acid contact lens according to the above item (3) wherein said spacer compound is an amino alcohol.

(5) The photocured crosslinked-hyaluronic acid contact lens according to the above item (4) wherein said amino alcohol is selected from the group consisting of aminoethanol, aminopropanol, aminobutanol, aminopentanol, aminohexanol, aminooctanol and aminododecanol.

(6) The photocured crosslinked-hyaluronic acid contact lens according to any one of the above items (1) to (5) wherein said photoreactive crosslinking group is introduced into hyaluronic acid to form said photoreactive hyaluronic acid derivative in an average ratio of from 0.2 to 5 mole % per constituent disaccharide unit of said hyaluronic acid.

(7) The photocured crosslinked-hyaluronic acid contact lens according to any one of the above items (1) to (6) which has a cornea-protecting effect.

(8) The photocured crosslinked-hyaluronic acid contact lens according to any one of the above items (1) to (6) which absorbs and cuts ultraviolet rays which are harmful to the eye.

(9) The photocured crosslinked-hyaluronic acid contact lens according to any one of the above items (1) to (6) wherein a physiologically useful and active substance is included in the lens, and said substance is gradually released during wearing of the lens.

(10) The photocured crosslinked-hyaluronic acid contact lens according to any one of the above items (1) to (6) which has a visual acuity-correcting effect.

(11) A process for preparing a photocured crosslinked-hyaluronic acid contact lens which comprises molding the photoreactive hyaluronic acid derivative according to the above item (1) into a shape that fits to the eyeball, and subsequently irradiating the shaped product with light to effect crosslinking between the mutual photoreactive crosslinking groups of said photoreactive hyaluronic acid derivative.

DETAILED DESCRIPTION OF THE INVENTION

Figure 1:
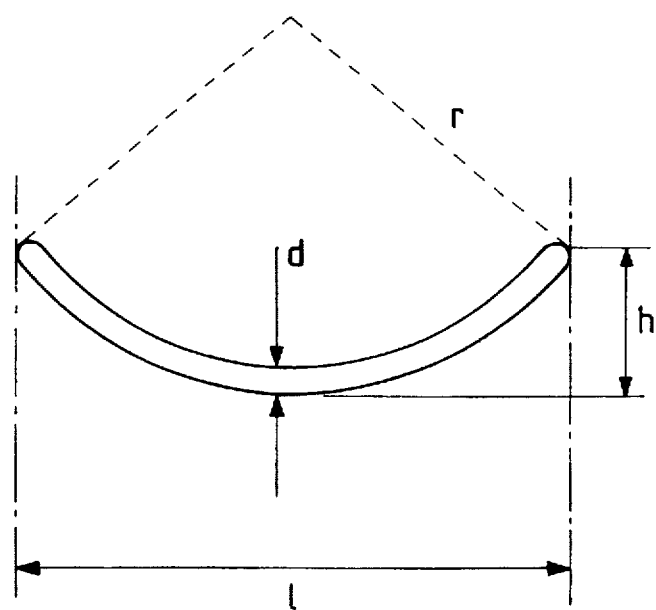
FIG. 1 is a sectional view of a photocured crosslinked-hyaluronic acid contact lens wherein r is a base curve, l is a lens diameter, h is a lens height and d is a lens thickness.

Hyaluronic acid is present in tissues and the like of animals including human, which has a repeating structure of a disaccharide consisting of $\beta$-D-N-acetylglucosamine and $\beta$-D-glucuronic acid, shows non-antigenicity, non-toxicity, bioreabsorbability and the like properties which are essential for bioaffinity and biocompatibility and is used by itself as drugs and cosmetics. Also, hyaluronic acid has such a markedly high water holding property that it can hold water in nearly 1,000 times larger amount than its own weight, and the resulting solution has high viscosity.

Since the photocured crosslinked-hyaluronic acid derivative used as materials for the contact lens of the present invention uses hyaluronic acid as its base compound, it can hold the excellent bioaffinity and biocompatibility and high water holding property of hyaluronic acid even after its molding and processing into shape of contact lenses. And since a photoreactive hyaluronic acid derivative in liquid form can be molded and processed into any shape and then insolubilized by its crosslinking through ultraviolet ray irradiation, it is easy to mold into a shape which fits to the eyeball. Thus it is possible to provide contact lenses having excellent tissue affinity and shape compatibility with the eyeball and high water holding property and high oxygen permeability.

The photocured crosslinked-hyaluronic acid contact lens of the present invention is prepared as a crosslinked hyaluronic acid contact lens by molding a photoreactive hyaluronic acid derivative obtained through the introduction of a photoreactive crosslinking group into a functional group of hyaluronic acid via a spacer group into a contact lens-like shape by an appropriate means and then irradiating the molded product with light, specifically ultraviolet rays. As mentioned later, the molding into a contact lens-like shape may be effected after photocrosslinking.

Hyaluronic acid may have an average molecular weight of preferably from about 100,000 to about 5,000,000, more preferably from 600,000 to 3,000,000.

Preferred examples of the photoreactive crosslinking group include those which have a vinylene group capable of undergoing dimerization by light irradiation. As a compound having such photoreactive crosslinking group (hereinafter, sometimes expressed as photoreactive compound), cinnamic acid or derivatives thereof, 1-carboxyalkylthymine, 7-coumaryloxyacetic acid and the like, of which cinnamic acid or derivatives thereof is more preferable in view of its low toxicity and high photoreactivity. In the present invention, a photoreactive hyaluronic acid derivative can be obtained by introducing the photoreactive crosslinking group into functional group of hyaluronic acid via a spacer group. It is preferable to couple the photoreactive crosslinking group to the spacer group, and then to bind the resulting photoreactive crosslinking group-linked spacer group with hyaluronic acid. Preferably, the spacer group may have two functional groups which can couple a carboxyl group of cinnamic acid or derivatives thereof with a carboxyl group or a hydroxyl group of hyaluronic acid.

Examples of the spacer group include those having an amino group and a hydroxyl group, those having an amino group and a carboxyl group, those having a carboxyl group and a hydroxyl group, those having two amino groups, and those having two hydroxyl groups; and those having two different functional groups are particularly preferable in view of the selectivity of the reaction. The number of functional groups of the spacer group is not limited to two, and a spacer group having more than two functional groups can also be used, with the proviso that it has at least two functional groups which can link to both the photoreactive group and hyaluronic acid.

Specific examples of the spacer group include those which are originated from spacer compounds such as amino acids or derivatives thereof, peptides, amino alcohols, diamines, oligosaccharides, diols, or hydroxy acids. Preferred examples include those which are originated from amino acids or derivatives thereof, peptides, amino alcohols or diamines. More preferred examples include those which are originated from amino alcohols.

The amino alcohols are not particularly limited with regard to their structures such as the number of carbon atoms, the presence or absence of branching and the like, provided that they have function as spacer compound, and they are selected preferably from the group consisting of aminoethanol, aminopropanol, aminobutanol, aminopentanol, aminohexanol, aminooctanol and aminododecanol.

Although a bonding mode of a spacer group with a functional group of hyaluronic acid or an introducing method of a spacer group-linked photoreactive crosslinking group varies depending on whether the photoreactive crosslinking group is introduced via the spacer group into a functional group of hyaluronic acid, that is, a carboxyl group or a hydroxyl group, it is preferably to introduce a photoreactive crosslinking group-linked spacer group into a carboxyl group of hyaluronic acid, and it is more preferable that the functional group of the spacer group to be linked to hyaluronic acid is an amino group and its bonding mode is an amide bond. With regard to the preparation method of the photoreactive hyaluronic acid derivative, it is preferable to couple such photoreactive compound as cinnamic acid, a cinnamic acid derivative or the like with a spacer compound in advance, react the obtained compound having photoreactive crosslinking group-linked spacer group with hyaluronic acid, and thus introduce the photoreactive crosslinking group-linked spacer group into functional groups of hyaluronic acid.

In an illustrative preparation method of the photoreactive hyaluronic acid derivative, for example in a case that the photoreactive crosslinking group-linked spacer group has an amino group to be coupled with a carboxyl group of hyaluronic acid by an amide bond, it can be prepared by dissolving hyaluronic acid in water alone or an aqueous solution containing a water soluble organic solvent (for example, dioxane, dimethylformamide, N-methylpyrrolidone, acetamide, alcohols (e.g. methanol, ethanol), pyridine and the like) and then allowing the amino group of the spacer compound to which a photoreactive crosslinking group is linked in advance to react with a carboxyl group of hyaluronic acid in the presence of a water soluble carbodiimide (for example, 1-ethyl-3-(3-dimethylaminopropyl) carbodiimide hydrochloride (EDC.HCl), 1-ethyl-3-(3-dimethylaminopropyl)carbodiimide methiodide, 1-cyclohexyl-3-(2-morpholinoethyl)carbodiimide hydrochloride and the like) and a condensation auxiliary agent. Examples of the said condensation auxiliary agent include N-hydroxysuccinimide, N-hydroxybenzotriazole and the like which not only activate carboxyl group but also have a function to prevent unnecessary O→N acyl rearrangement.

Using products with high purity and low endotoxin content of raw materials, reagents and the like of aforementioned photoreactive hyaluronic acid derivative and taking care of sterile and clean conditions of reaction vessels and reaction circumstances, it is possible to obtain photoreactive hyaluronic acid derivative having very low content of endotoxin (for example, 1.2 pg/mg or lesser).

Using such photoreactive hyaluronic acid derivative, molding and photocrosslinking as described later, it is possible to prepare photocured crosslinked-hyaluronic acid contact lens having markedly low irritability.

Since a water soluble photoreactive hyaluronic acid derivative can be synthesized by controlling the introduction ratio of photoreactive crosslinking groups, the said derivative can be molded into a desirable shape which fits to the shape of the eyeball (for example, a shape having spherical surface like the case of a contact lens). And then the molded derivative is irradiated with light such as ultraviolet rays and the like resulting in dimerization of the mutual cosslinking groups and formation of a three dimensional network structure of the hyaluronic acid chains, so that the contact lens of the present invention which comprises a water insoluble crosslinked hyaluronic acid derivative can be prepared.

Alternatively, the contact lens of the present invention may be prepared by molding a photoreactive hyaluronic acid derivative into an appropriate shape, irradiating with ultraviolet rays to effect crosslinking, thereby preparing an insoluble crosslinked hyaluronic acid, and then processing into a shape which fits to the shape of eyeball by cut polishing, embossing (pressing) or the like.

The introduction ratio of the photoreactive crosslinking group (degree of substitution, to be referred to as "DS" hereinafter) is expressed by introduced mole % per constituent disaccharide unit. For example, "DS 100%" means that one photoreactive crosslinking group is introduced per one constituent disaccharide, and "DS 1%" means that one photoreactive crosslinking group is introduced per 100 constituent disaccharides, namely 200 monosaccharides. The photoreactive hyaluronic acid derivative may have a DS value of preferably from 0.2 to 5 mole %, more preferably from 0.5 to 2 mole %, and most preferably from 0.7 to 1.5 mole %.

When the spacer group is not introduced into the photoreactive crosslinking group, an extremely high DS value is required in order to obtain an insoluble photocured crosslinked-hyaluronic acid derivative (DS 100 mole % or more; in the case of a known photocured crosslinked-hyaluronic acid contact lens in which cinnamic acid is introduced into a hydroxyl group of hyaluronic acid, its DS value is 170% or 290%). However, the insoluble photocured crosslinked-hyaluronic acid derivative can be formed by ultraviolet ray irradiation from a photoreactive hyaluronic acid derivative having a markedly low DS value when the spacer group is introduced, thereby rendering possible sufficient holding of the characteristics of hyaluronic acid as the base high polymer.

The photocured crosslinked-hyaluronic acid derivative to be used as the contact lens material of the present invention is obtained through the formation of a three dimensional network structure of hyaluronic acid chains due to crosslinked cyclobutane ring formed by the irradiation of the photoreactive hyaluronic acid derivative with light such as ultraviolet rays and the like, and the material derivative forms a macromolecule because of the network structure and becomes insoluble in solvents such as water. Ultraviolet rays which are irradiated to effect photocrosslinking are not particularly limited, provided that they have a wavelength by which photodimerization can be effected and its wavelength, energy and light source do not exert bad influences such as degradation to smaller molecule due to cleavage and the like of hyaluronic acid chain, and the wavelength may be within the range of from 200 to 600 nm, preferably from 200 to 450 nm, and more preferably from 250 to 300 nm, and the light source may be preferably a high pressure mercury lamp or a metal halide lamp. The irradiation time may be approximately from 1 to 30 minutes, preferably from 2 to 10 minutes.

Irradiation method is not particularly limited. For example, by moving at an appropriate speed of the molded photoreactive hyaluronic acid derivative on conveyer, it is possible to irradiate with light such as ultraviolet rays and the like and to photocrosslink continuously.

Degree of the crosslinking of photocured crosslinked-hyaluronic acid is calculated as a crosslinking ratio which is defined by the following formula.

Crosslinking ratio (%) = (number of moles of dimerized product) × 2/(number of moles of introduced photoreactive compound) × 100

As an illustrative method, photoreactive compound such as cinnamic acid and the like and/or its dimerized product are cleaved and extracted from the photocured crosslinked-hyaluronic acid derivative by chemical method, the extracts are analyzed by a gel permeation chromatography (GPC) to separate cinnamic acid and its dimerized product from each other based on the difference in their molecular weights and then their respective numbers of moles are obtained to calculate the crosslinking ratio based on the above formula.

A crosslinking extent can be calculated based on the following formula.

Crosslinking extent (%)=crosslinking ratio×DS/100

The crosslinking ratio is a percentage based on the introduced photoreactive compound such as cinnamic acid and the like, and the crosslinking extent can be expressed as mole % of dimerized product per repeating disaccharide unit of hyaluronic acid by the above formula. For example, when a photoreactive hyaluronic acid derivative having a DS value of 1.0% (introduction of one photoreactive compound per 100 disaccharide units) is crosslinked with a crosslinking ratio of 10%, its crosslinking extent can be expressed as 0.1% (dimerization of one photoreactive compound per 1,000 constituent disaccharide units).

Molding of the material into a spherical surface shape which fits to the shape of eyeball, for example the usual shape of contact lens, may be carried out either before or after the photocrosslinking by light irradiation, but it is easy to process a photoreactive hyaluronic acid derivative before irradiation while it is soluble in solvents such as water.

Molding and processing of the CL of the present invention can be effected by applying generally used known methods such as a cut polishing method, a spin casting method (centrifugal casting), a pressing method, a molding method and the like (U.S. Pat. No. 4,532,267, JP-A-63-50816, JP-A-5-93889). Of these methods, a molding method and a spin casting method are preferable, and a molding method is particularly preferable because of its simple and easy workability.

In an illustrative example of the molding method, for example when molded into a shape of a partially cut off spherical surface as shown in FIG. 1, it can be effected simply and easily by a method in which an aqueous solution of photoreactive hyaluronic acid derivative is poured into a container having an inner wall shape of interest (for example, a container having a test tube like bottom, a watch glass or the like) and then dried by allowing it to stand at a certain temperature.

With regard to the container to be used as a mold, it can be arbitrarily changed depending on the shape of final product, and a container having a semi-spherical inner wall bottom shape such as a test tube is particularly suited for the molding into a contact lens like shape. When such a type of container is used, a contact lens having a shape which fits to the eyeball can be molded by controlling its size, particularly diameter of its semi-spherical part. In general, base curve of a contact lens (radius (r) of the outer wall surface of FIG. 1) is determined by the container diameter (corresponding to the base curve of lens in dry state) and swelling ratio in wet state. In general, curvature radius of the frontal portion of the eye (cornea) of human is considered to be about 6 to 9 mm, more limitatively about 7 to 8.5 mm.

Raw materials of the above-mentioned container are not particularly limited, but a material having too high affinity for water is not desirable because a large amount of the aqueous solution of photoreactive hyaluronic acid derivative is adhered to its outer wall; on the other hand, a material having too high water repellency will make the lens an undesirable shape when dried. Illustratively, plastics which can be processed easily are preferred. Specifically, polypropylene, polystyrene and polyethylene are preferred, and polypropylene is particularly preferred.

A thickness of the lens can be controlled at an appropriate thickness by adjusting concentration and liquid volume of the aqueous solution of photoreactive hyaluronic acid derivative. The thickness of contact lens in dry state may be within the range of generally from 50 to 300 μm, preferably from 100 to 150 μm. In order to prepare a contact lens having such a range of thickness, for example to mold into a lens having a base curve of 6 to 9 mm, it is desirable that the concentration of the aqueous solution of photoreactive hyaluronic acid derivative may be adjusted to about 3 to 20 mg/ml, preferably about 5 to 15 mg/ml, and more preferably about 10 mg/ml.

A bubble-free uniform lens can be molded by thoroughly degassing after injection of the aqueous solution of the said derivative into a container.

Temperature at the time of drying may be within such a range that it does not exert bad influences upon properties of the material, such as cleavage (reduction of molecular weight) of hyaluronic acid chain, and is preferably 35° to 50° C. in general. It is desirable to control the temperature at a constant level in order to effect uniform drying. Also, it is desirable to carry out the drying slowly and gradually, so that rapid forced drying under reduced pressure or by blowing is not desirable.

After completion of molding in the aforementioned manner, the resulting product on the mold or after releasing from the mold is exposed to ultraviolet rays to obtain a photocured crosslinked-hyaluronic acid contact lens which, if necessary, is further cut into a shape of interest.

Thus obtained photocured crosslinked-hyaluronic acid contact lens is sufficiently insolubilized even at an extremely low DS level, with a gelation ratio of 65% or more. In this instance, the gelation ratio is expressed by the following formula.

Gelation ratio (%) =

(re-dried weight of contact lens/dry weight of contact lens) × 100

In this formula, the term "re-dried weight of contact lens" means a weight measured after soaking the contact lens in 10,000 times larger amount of water than the dry weight of contact lens, collecting it by filtration 24 hours thereafter and then drying it under a reduced pressure, and the term "dry weight of contact lens" means a weight measured after drying it under a reduced pressure before its soaking.

A water content is obtained by measuring weights of contact lens at room temperature after equilibrium water absorption (Ww) and before swelling (Wd) and a calculating based on a formula (Ww−Wd)/Ww×100.

Since the photocured crosslinked-hyaluronic acid contact lens of the present invention uses a photocured crosslinked-hyaluronic acid derivative having a markedly low DS value as its material, it has still sufficient strength and simultaneously keeps high water holding property which is a characteristic feature of its base high polymer hyaluronic acid. Since its water content can be held at 80 to 99% by controlling the molecular weight of hyaluronic acid, DS value, irradiation time of light and the like, the inventive contact lens is possessed of flexibility and softness and keeps properties of SCL.

The photocured crosslinked-hyaluronic acid contact lens having a base curve close to the corneal curvature radius of the eyeball obtained processed by the above molding method and processing, shows high bioaffinity for tissues of the eye due to its flexibility and softness originated from its high water holding property and moreover high oxygen permeability, so that irritant actions originated from conjunctivitis, lamellar keratitis, corneal erosion and the like, are not observed after 4 days to 1 week of its wearing. In wearing on the cornea, holding capacity of the lens on the eye is improved when the base curve of CL is slightly larger than the corneal curvature radius, and such a base curve is preferably about 6 to 9 mm, more preferably about 7 to 8.5 mm.

Depending on its use, CL should have transparency, water wettability, oxygen permeability, appropriate refractive index and the like.

With regard to the transparency, it may have such a minimum transparency that it does not obscure the field of vision, provided that it is not used for visual acuity correction. It is preferable that its light transmittance at a wavelength of 550 nm is about 50% or more, or about 80% or more when a colorless and transparent lens is particularly required.

In the present invention, the light transmittance is a value obtained by measuring visual light transmittance at the aforementioned wavelength at room temperature using Shimadzu Self-registering Spectrophotometer UV-2200 (manufactured by Shimadzu Corp.).

Water wettability relates to surface physical affinity (it means that the material surface has high water wettability) and can be expressed by a contact angle. The low contact angle of the photocured crosslinked-hyaluronic acid contact lens shows high hydrophilic property of the lens surface. Roughness of the inside surface can be controlled at a desired value for example by adjusting surface roughness of the mold.

In the present invention, the contact angle is a value measured by a water droplet method using a film of the same material of the contact lens and using FACE Contact Angle Meter (Model CA-A, manufactured by Kyowa Surface Science Co., Ltd.).

A swelling ratio when dried contact lens if moistened is an index of shape stability, and the range of linear swelling ratio, though it varies depending on each use, is generally from about 1 to 80%. More illustratively, the linear swelling ratio is within an approximate range of from about 1 to 10%, preferably from about 2 to 5%, in the case of a relatively hard lens, and from about 10 to 80%, preferably from about 15 to 75%, in the case of a relatively soft lens. Since the present invention mainly aims at a relatively soft lens, it may preferably have a linear swelling ratio of about 10 to 80%.

The linear swelling ratio is a value obtained by measuring diameter (Dw) of a film of the same material of contact lens after equilibrium water absorption and its diameter (Dd) before swelling at room temperature and calculating the value based on a formula (Dw−Dd)/Dd×100.

Since the photocured crosslinked-hyaluronic acid contact lens of the present invention does not induce serious anterior eye symptoms such as corneal erosion and the like even after on week of continuous wearing, it seems that it has excellent oxygen permeability and that such an improvement of oxygen permeability is due to the increased water content in comparison with those of known contact lenses.

In the contact lens of this invention, oxygen permeability was observed and calculated by an electrode method at 35° C. using an improved device for contact lens consisting of a dissolved oxygen meter DU-25A type (TOA Electronics Ltd.) and an electrode OE-2111 type (TOA Electronics Ltd.) as an oxygen permeability coefficient (Dk value).

In general, the Dk value of the known SCL (water content about 38%) of polymer of 2-hydroxyethyl methacrylate is about $9 \times 10^{-11}$ (cm$^2$/sec)·(ml O$_2$/ml·mmHg). However, as the contact lens of this invention is intended to have high water content and high oxygen permeability, its Dk value may be preferably $40 \times 10^{-11}$ to $100 \times 10^{-11}$ (cm$^2$/sec)·(ml O$_2$/ml·mmHg), more preferably and particularly $60 \times 10^{-11}$ to $90 \times 10^{-11}$ (cm$^2$/sec)·(ml O$_2$/ml·mmHg).

A specified refractive index is not always required when the lens is used for therapeutic purpose, but it is desirable that it has a refractive index similar to that of generally used corrective CL when used for the purpose of visual acuity correction. The index may be generally about 1.3 to 1.6, preferably about 1.3 to 1.5.

In the present invention, the refractive index was measured using a film of the same material of the contact lens and using Abbe's refractometer (manufactured by Atago Co., Ltd.).

Since the photoreactive crosslinking group of the photocured crosslinked-hyaluronic acid contact lens of the present invention can absorb light of ultraviolet region, the lens can cut off ultraviolet rays which exert bad influences upon the eye. In general, when a photoreactive hyaluronic acid derivative is photocrosslinked, all of the photoreactive crosslinking groups do not always form crosslinked cyclobutane rings, and some of them remain un-crosslinked and show sufficient ultraviolet ray absorbing capacity.

Shape of the photocured crosslinked-hyaluronic acid contact lens of the present invention is not particularly limited and can be changed into not only so-called contact lens shape but also any shapes depending on its use. For example, it may be a half moon or elliptic shape suitable for inserting under lower eyelid, which has such shape and size that it fits to the partial shape of the eyeball in the inserting area. In that case, its length in the major axis direction is 4 to 10 mm and its length in the minor axis direction is 2 to 5 mm. Such a type of lens is not expected to have a refraction correcting effect or a cornea protecting effect but can be used as a base material for sustained release of various drugs included therein.

The lens of the present invention can be fully applied to a therapeutic CL, because hyaluronic acid which is the base high molecular compound of the photocured crosslinked-hyaluronic acid derivative to be used as the material of the present invention by itself has actions and effects such as tissue non-adhesiveness, biodegradability, moisture keeping effect (water holding effect), corneal epithelium wound healing enhancing action (corneal epithelium layer extension enhancing action) and the like (see JP-B-7-23317 and JP-A-1-238530 for such functions of hyaluronic acid).

Since the photocured crosslinked-hyaluronic acid contact lens of the present invention by itself has high affinity for and compatibility with the eyeball, high water holding property and high oxygen permeability, it can be fully used as a cornea protecting material.

When a contact lens is used as a material for the protection of corneal damage, it must have such a protective property that the damaged area can be covered and the material itself must be at least non-stimulative. Even from such points of view, the photocured crosslinked-hyaluronic acid contact lens of the present invention can be used satisfactorily as a cornea protecting material because of its softness and flexibility in addition to its high bioaffinity and biocompatibility.

When physiologically useful and active compounds (compounds having pharmacological effects; medicines) are contained in the photocured crosslinked-hyaluronic acid contact lens of the present invention, it exerts a sustained release function to release these compounds at a constant rate for a certain period of time, so that it can be used for therapeutic purposes such as treatment of corneal disorders (e.g., corneal damage and corneal ulcer), protection of cornea after operation, administration of drugs into the eye and transmucosal administration of drugs into the body.

Specifically, for example, it can be used for the healing enhancement of corneal epithelium disorders such as superficial punctate keratitis, keratitis superficialis diffusa (KSD), delayed corneal epithelium deficiency, corneal ulcer and the like; enhancement of corneal treatment (wound healing) after surgery such as refractive keratoplasty, cataract operation, ophthalmic wound operation, glaucoma operation and the like; symptomatic relaxation of tear secretion deficiency; and sustained release of drugs contained in the material such as hyaluronic acid (not crosslinked, not modified), antiviral agents (e.g., acyclovir, idoxuridine, 5-bromovinylarabinofuranosyl uracil, adenine arabinoside, poly IC), antibiotics (e.g., kanamycin, bekanamycin, amikacin, gentamicin, micronomicin, chloramphenicol, colistin, polymyxin B), antifungal agents (e.g., ampotericin B, miconazole), antiprotozoan drugs, antiglaucoma agents (e.g., timolol, β-adrenergic blocking drug), antiinflammatory drugs, steroids, antihistaminices, miotics, anticholinergics, mydriatics (e.g., mydrin P), decongestants, hormones (e.g., insulin, glucagon) and the like drugs (see JP-A-1-238530, JP-A-1-279836, JP-W-61-501729, JP-A-4-230636 and JP-A-5-93889 for illustrative examples).

Examples of the present invention are given below by way of illustration and not by way of limitation.

EXAMPLES

In the following Reference Examples, Boc means t-butoxycarbonyl and -Cin means —COCH=CH—Ph (wherein Ph means phenyl group).

REFERENCE EXAMPLE 1

1-1: Synthesis of Boc-NH(CH$_2$)$_2$O-Cin (Compound (1-1))

A 3 ml portion of chloroform was added to 464 µl (3 mmol) of t-butoxycarbonyl-2-aminoethanol, and to the resulting mixture cooled in an ice bath were subsequently added 417 µl (3 mmol) of triethylamine, 431 µl (3 mmol) of cinnamic acid chloride and 183 mg (1.5 mmol) of 4-dimethylaminopyridine in that order. After 20 minutes stirring at room temperature, the reaction solution was mixed with ethyl acetate, subjected to partition washing with 5% aqueous citric acid solution twice, water, 5% aqueous sodium bicarbonate solution twice, water and saturated brine in that order and then dried on anhydrous sodium sulfate. Anhydrous sodium sulfate was removed by filtration, the resulting filtrate was concentrated under a reduced pressure and then the thus precipitated white solid was washed with hexane and dried under a reduced pressure to obtain 527 mg of Compound (1-1) with a yield of 60%.

$^1$H-NMR (CDCl$_3$):

δ (ppm)≈

1.45, 9H, s (Boc-)

3.55, 2H, m (—NH<u>CH$_2$</u>CH$_2$O—)

4.25, 2H, m (—NHCH$_2$<u>CH$_2$</u>O—)

4.85, 1H, br (CO<u>NH</u>—)

6.45, 1H, d (—CH:<u>CH</u>CO—)

7.45, 4H, dd (aromatic H)

7.75, 1H, d (—<u>CH</u>:CHCO—)

1-2: Synthesis of 2-aminoethyl cinnamatehydrochloride [Compound (1-2): HCl·H$_2$N(CH$_2$)$_2$O-Cin]

Under cooling in an ice bath, 2 ml of 4M hydrogen chloride/dioxane solution was added to 291 mg (1 mmol) of Compound (1-1), and the mixture was stirred for 35 minutes. This was mixed with ether, and the thus precipitated crystals were collected by filtration, washed with ether and then dried under a reduced pressure to obtain 173 mg (yield, 76%) of Compound (1-2) as white crystals.

REFERENCE EXAMPLE 2

2-1: Synthesis of Boc-NH(CH$_2$)$_6$O-Cin [Compound (2-1)]

Compound (2-1) was synthesized in accordance with the procedure of Reference Example 1-1, with a yield of 99%.

2-2: Synthesis of 6-aminohexyl cinnamate hydrochloride [Compound (2-2): HCl·H$_2$N(CH$_2$)$_6$O-Cin]

Compound (2-2) having a melting point of 98.8 to 100.4° C. was synthesized in accordance with the procedure of Reference Example 1-2, with a yield of 86%.

$^1$H-NMR (400 MHz, D$_2$O)

δ (ppm)=

1.48–1.53 (4H, m, H$_2$NCH$_2$CH$_2$(<u>CH$_2$</u>)$_2$CH$_2$CH$_2$O—), 1.63–1.83 (4H, m, H$_2$NCH$_2$<u>CH$_2$</u>(CH$_2$)$_2$<u>CH$_2$</u>CH$_2$O—), 3.02 (2H, t, H$_2$N<u>CH$_2$</u>(CH$_2$)$_5$O—), 4.28 (2H, t, H$_2$N(CH$_2$)$_5$<u>CH$_2$</u>O—), 6.60 (1H, d, —CH=<u>CH</u>CO—), 7.53 (3H, m, aromatic H at the 3-, 4- and 5-positions), 7.68 (2H, d, aromatic H at the 2- and 6-positions), 7.76 (1H, d, —<u>CH</u>=CHCO—)

EXAMPLE 1

1-1: Preparation of photoreactive hyaluronic acid derivative (DS, 2.21%) in which cinnamic acid was introduced into a carboxyl group of hyaluronic acid via a 6-aminohexanol-derived spacer group A 7.5 g portion of sodium hyaluronate (manufactured by Seikagaku Corporation; molecular weight, about 1,000,000) (18.75 mmol disaccharide unit) was dissolved in 1.125 l of distilled water for injection use, and the solution was mixed with 562.5 ml of 1,4-dioxane and thoroughly stirred. Next, under cooling in an ice bath, to this were added 431.5 mg (3.75 mmol)/50 ml of N-hydroxysuccinimide aqueous solution, 359.3 mg (1.875 mmol)/50 ml of N-ethyl-N'-3-dimethylaminopropylcarbodiimide hydrochloride aqueous solution and 532.5 mg (1.875 mmol)/50 ml of 6-aminohexyl cinnamate hydrochloride aqueous solution in that order, subsequently the solution was stirred for 4 hours at room temperature. A 10 g portion of sodium chloride was dissolved in the resulting solution which was subsequently added to 4.5 l of ethanol to effect formation of white precipitate. After centrifugation, the obtained precipitate was washed three times with 1.8 l of 80% ethanol and then once with ethanol. Thereafter, the resulting precipitate was dried in a vacuum desiccator to obtain 7.49 g of the photoreactive hyaluronic acid derivative in a white cotton-like form. Its DS value was 1.21% and its endotoxin content was 1.2 pg/mg.

1-2: Preparation of photocured crosslinked-hyaluronic acid contact lens

A 300 mg portion of the photoreactive hyaluronic acid derivative obtained in Example 1-1 was dissolved in 30 ml of distilled water for injection use, and the solution was dispensed in 1 ml portions into 27 polypropylene tubes (φ 1.6 cm×15 cm). Each of the dispensed solution was degassed in a vacuum desiccator, molded by a centrifugation method and then dried at 50° C. for 2 days. Each of the samples thus made into a lens-like shape was taken out from the tube, held between Pyrex glass plates and then exposed to ultraviolet rays (light source, 3 kW metal halide lamp; irradiation distance, 125 mm; conveyor speed, 1 m/min) for 4 minutes for each side. After the irradiation, the obtained lens was swelled in physiological saline and cut with a metal cylinder of 1.4 cm in diameter to obtain a photocured crosslinked-hyaluronic acid contact lens having a sectional structure shown in FIG. 1.

Its size was 1.4 cm in lens diameter (l), 0.4 cm in lens height (h) and 0.2 mm in lens thickness (d), and its physical values were 81.3% in water content (water, room temperature) and 23% in linear swelling ratio.

EXAMPLE 2

2-1: Preparation of photoreactive hyaluronic acid derivative (DS, 0.53%)

A 10 g portion of sodium hyaluronic (manufactured by Seikagaku Corporation; molecular weight, about 1,000,000) (25 mmol disaccharide unit) was dissolved in 1.5 l of water, and the solution was mixed with 750 ml of 1,4-dioxane. Under cooling in an ice bath, to this were added 50 ml of 288 mg (2.5 mmol) N-hydroxysuccinimide aqueous solution, 50 ml of 240 mg (1.25 mmol) N-ethyl-N'-3-dimethylaminopropylcarbodiimide hydrochloride aqueous solution and 50 ml of 355 mg (1.25 mmol) 6-aminohexyl cinnamate hydrochloride aqueous solution in that order at 5 minutes' interval. After 8 hours stirring at room temperature, this was mixed with 10 g of sodium chloride aqueous solution, stirred for 1 hour and then poured into 5 l of ethanol. The formed precipitate of interest was subjected to centrifugation (4,000 rpm×15 min), and the collected precipitate was washed three times with 80% ethanol and then once with ethanol. Thereafter, the resulting precipitate was dried to obtain 9.73 g of the photoreactive hyaluronic acid derivative as a white solid (DS value, 0.53%, endotoxin content, 0.8 pg/mg).

2-2: Preparation of photocured crosslinked-hyaluronic acid contact lens

A 300 mg portion of the photoreactive hyaluronic acid derivative obtained in Example 2-1 was dissolved in 30 ml of distilled water for injection use, and the solution was dispensed in 1 ml portions into 27 polypropylene tubes (φ 1.6 cm×15 cm). Each of the dispensed solution was degassed in a vacuum desiccator, molded by a centrifugation method and then dried at 50° C. for 2 days. Each of the samples thus made into a lens-like shape was taken out from the tube, held between Pyrex glass plates and then exposed to ultraviolet rays (light source, 3 kW metal halide lamp; irradiation distance, 125 mm; conveyor speed, 1 m/min) for 4 minutes for each side. After the irradiation, the obtained lens was swelled in physiological saline and cut with a metal cylinder of 1.4 cm in diameter to obtain a photocured crosslinked-hyaluronic acid contact lens.

Physical properties of the contact lenses prepared in Examples 1 and 2 are shown in Table 2.

TABLE 2

Physical properties of photocured crosslinked-hyaluronic acid contact lens

|  | Ex. 1 | Ex. 2 |
| --- | --- | --- |
| DS (mol %) | 1.21 | 0.53 |
| Crosslinking ratio (%) | 35.1 | 16.6 |
| Crosslinking extent (mole %) | 0.42 | 0.09 |
| Lens diameter (mm)* | 14 | 14 |
| Lens height (mm)* | 4.0 | 3.0 |
| Lens thickness (μm)* | 200 | 200 |
| Base curve (mm)* | 8.1 | 9.7 |
| Gelation ratio (%) | 86 | 67 |
| Transmittance (%) | 85 | 90 |
| Refractive index | 1.334 | 1.334 |
| Water content (%) | 81.3 | 93 |
| Linear swelling ratio (%) | 23 | 75 |
| Contact angle (degree) | 19 | 14 |

*Values obtained after swelling in physiological saline

EXAMPLE 3

Optical transmittance of photocured crosslinked-hyaluronic acid contact lens

Figure 2:
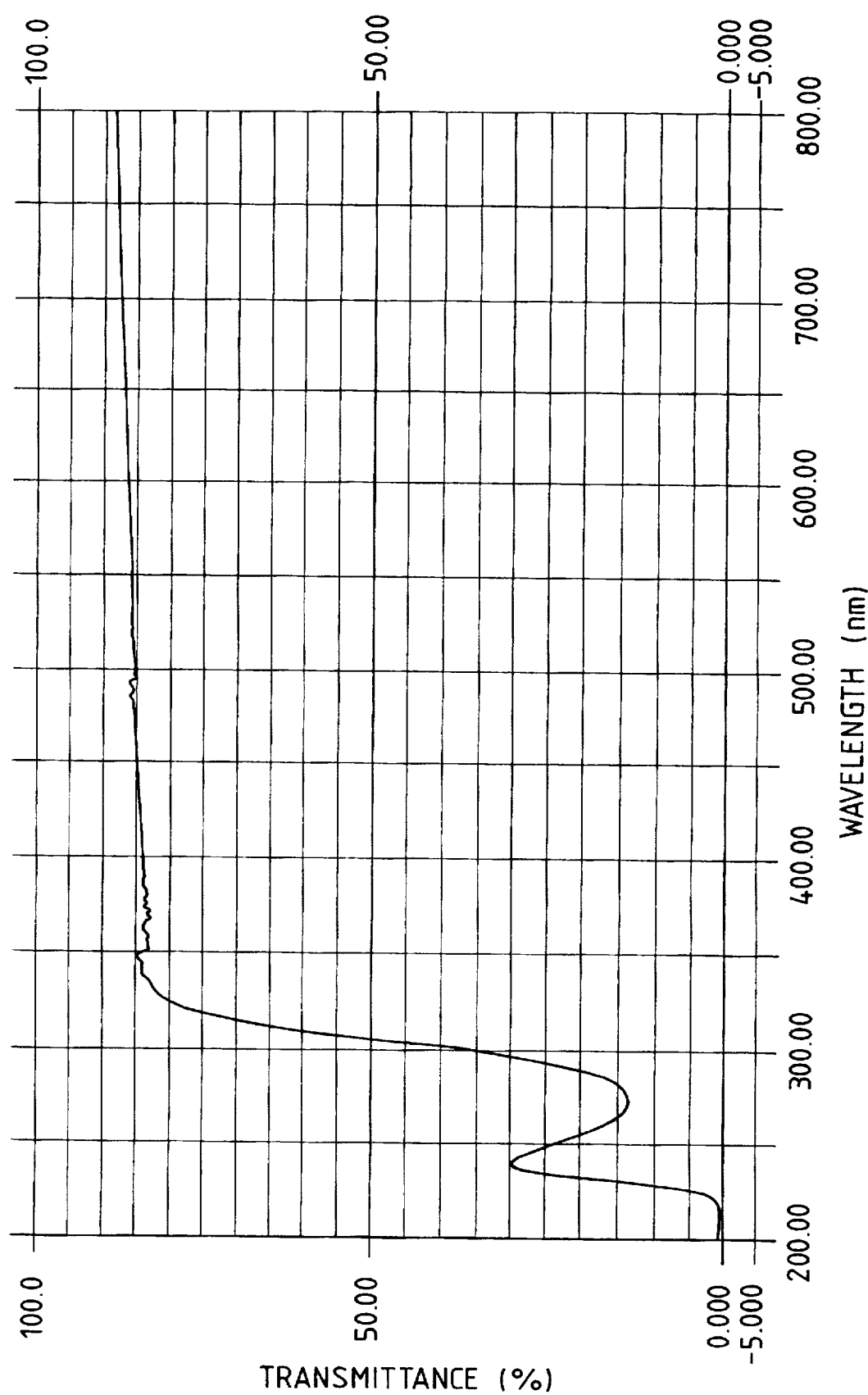
FIG. 2 is a graph showing the relationship between transmittance and wavelength of the photocured crosslinked-hyaluronic acid contact lens of Example 1.
Figure 3:
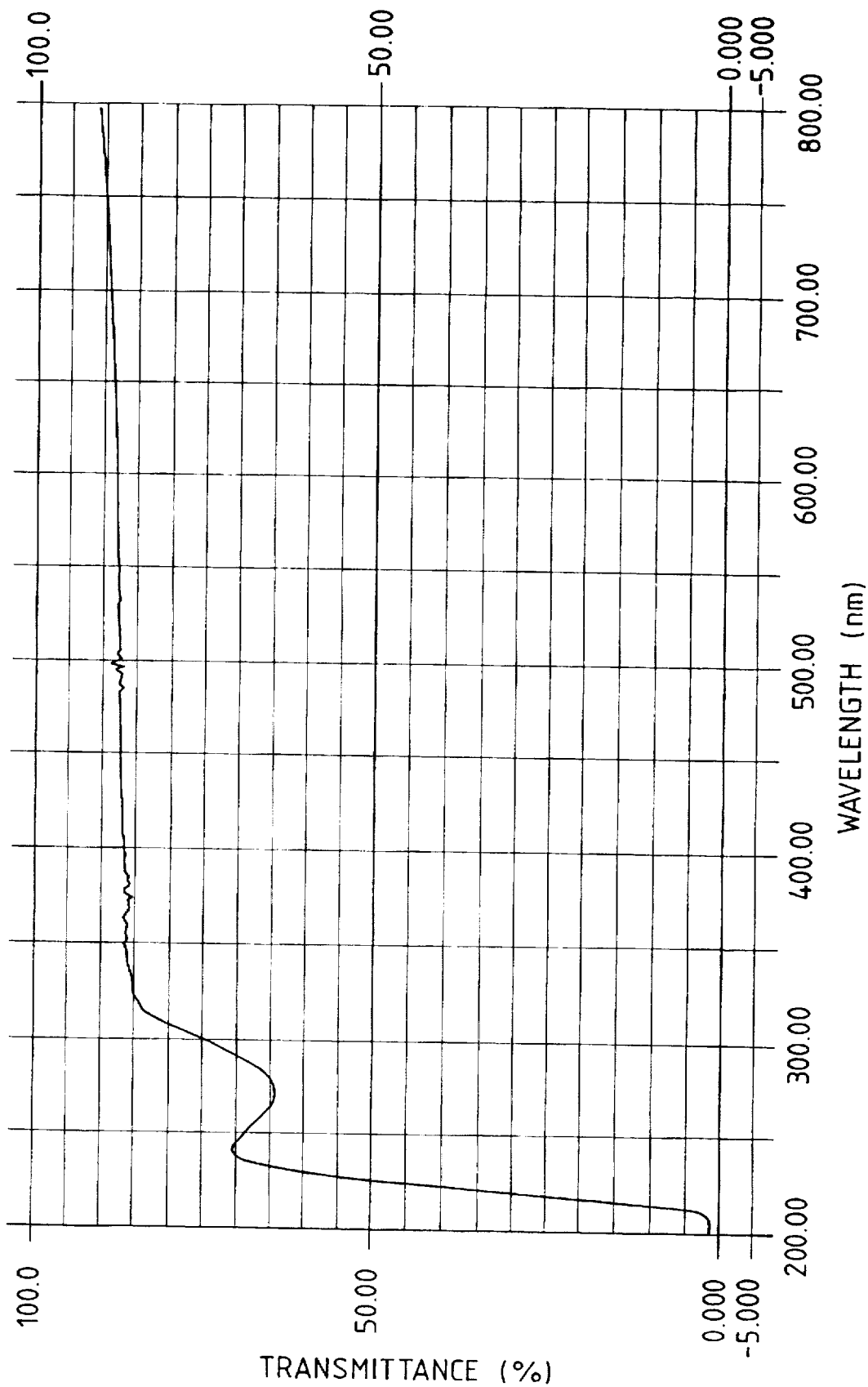
FIG. 3 is a graph showing the relationship between transmittance and wavelength of the photocured crosslinked-hyaluronic acid contact lens of Example 2.
Figure 4:
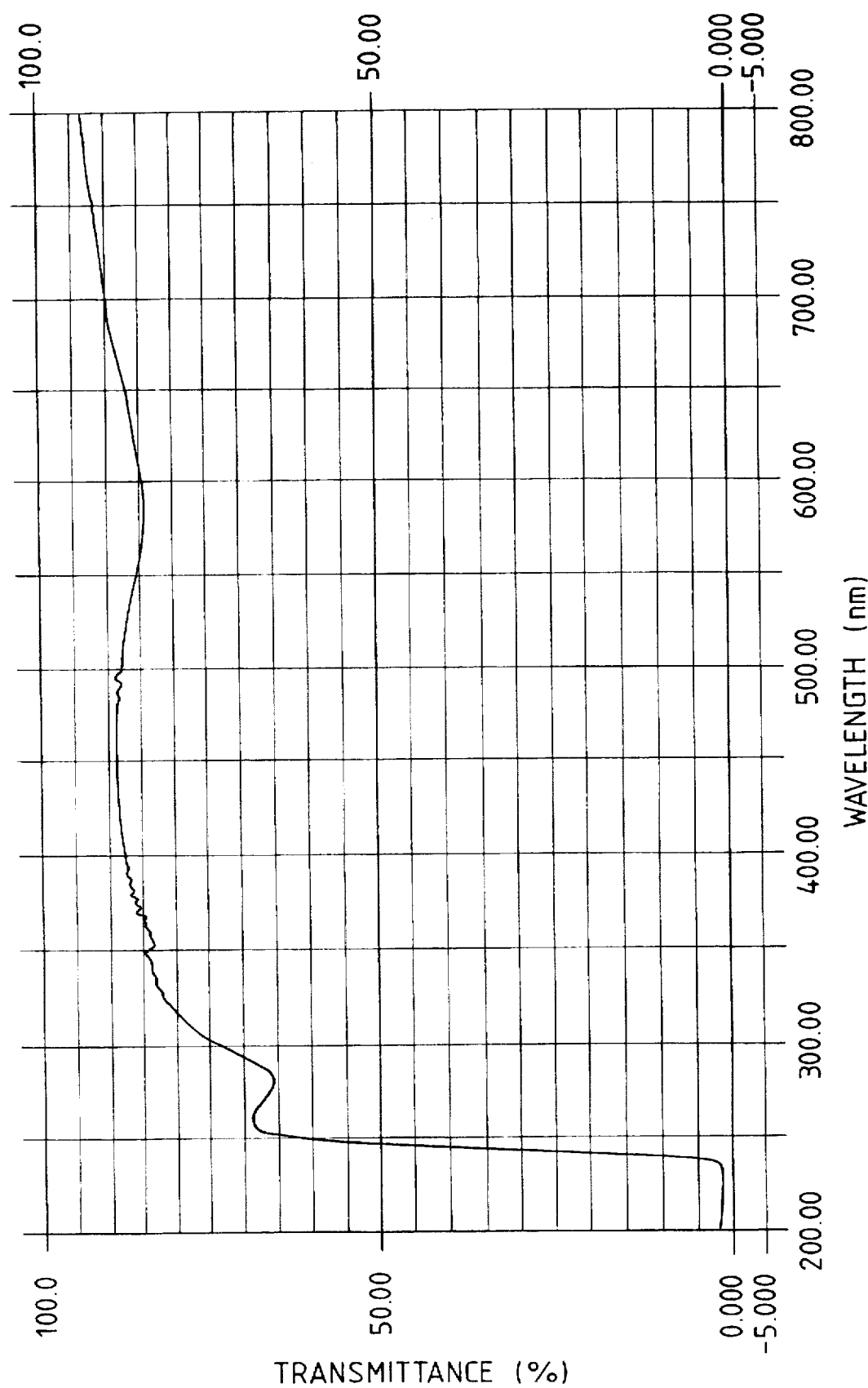
FIG. 4 is a graph showing the relationship between transmittance and wavelength of Crystal Color (Kuraray Co., Ltd.).
Figure 5:
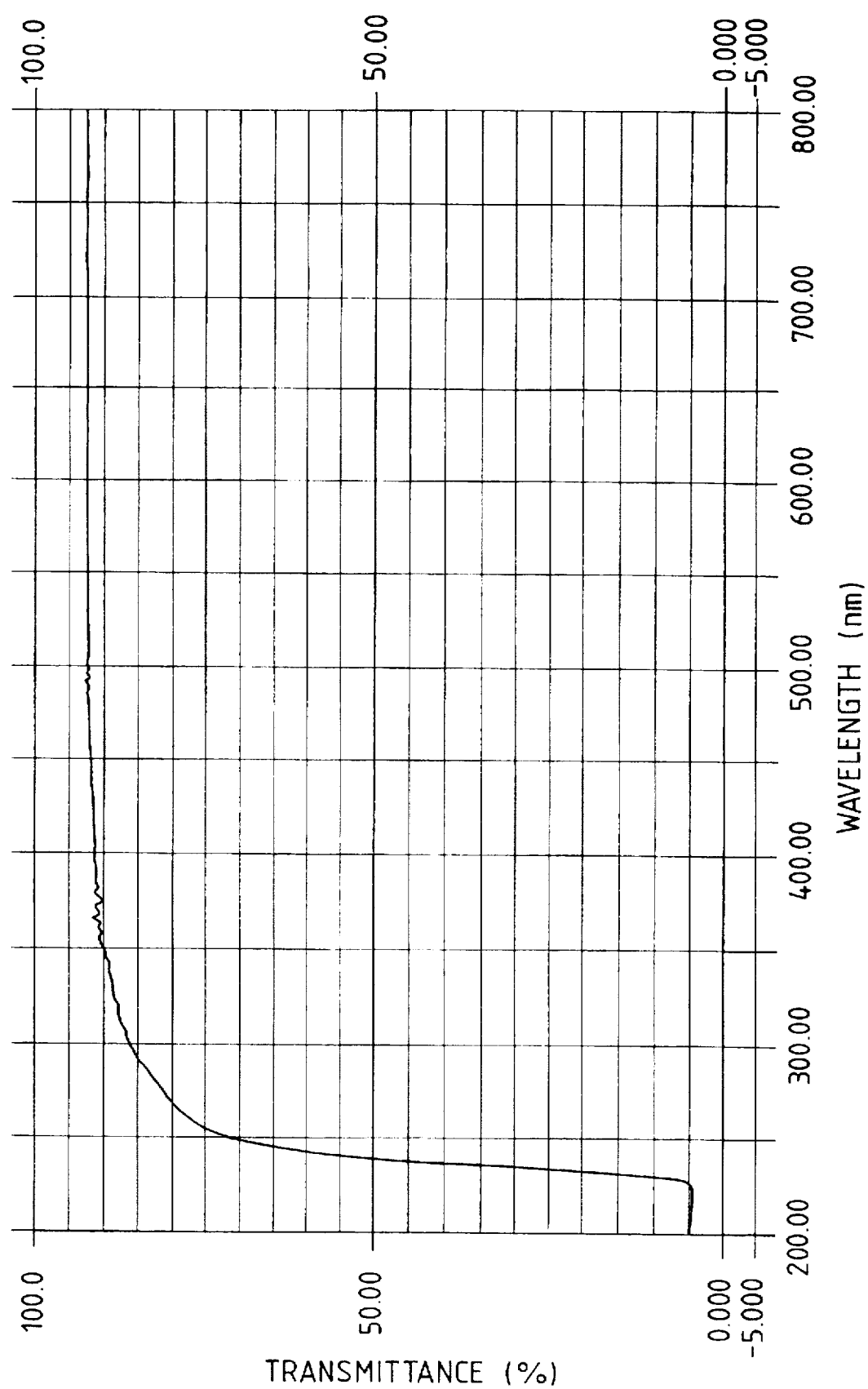
FIG. 5 is a graph showing the relationship between transmittance and wavelength of Breth-O (Toray Industries, Inc.).
Figure 6:
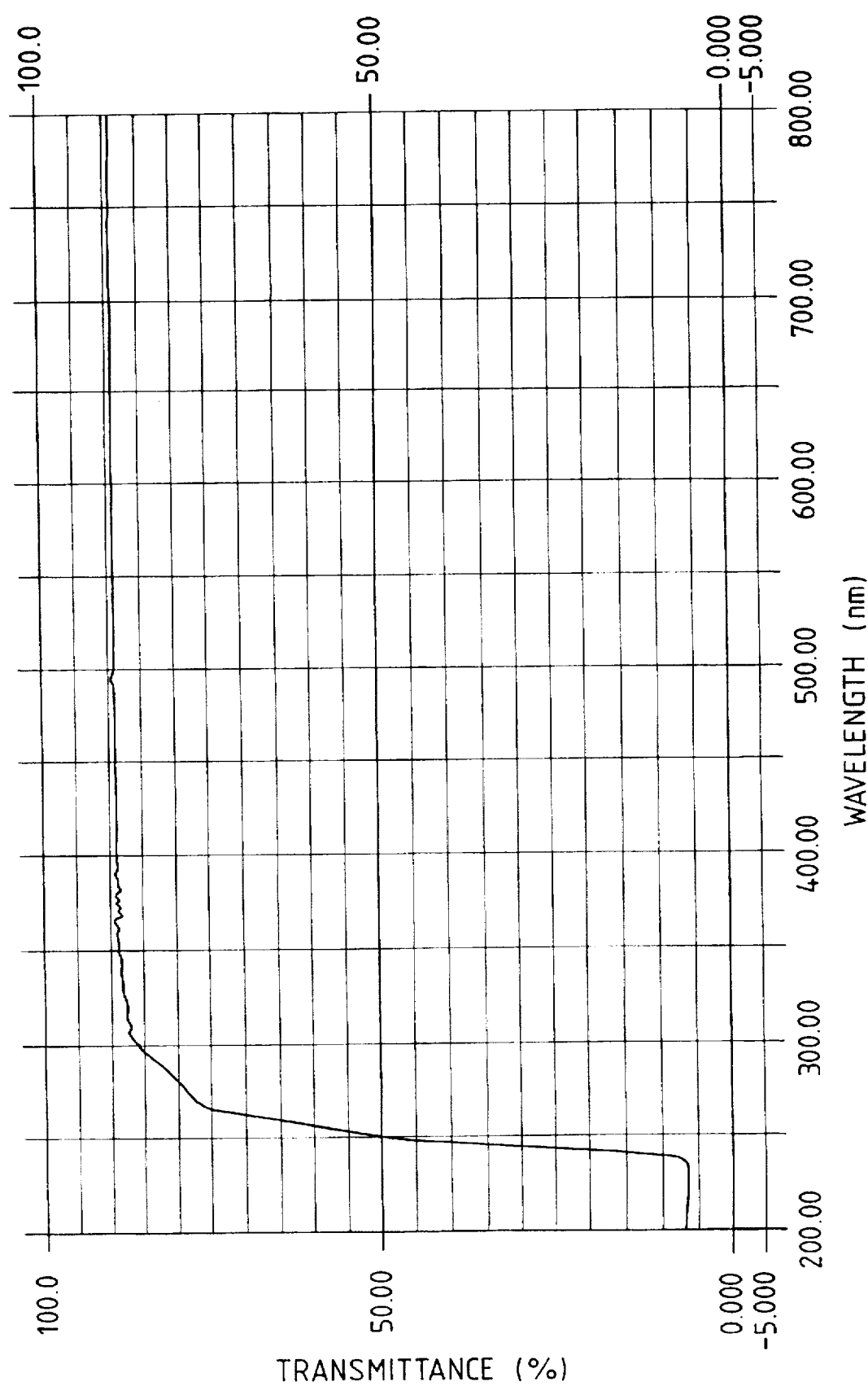
FIG. 6 is a graph showing the relationship between transmittance and wavelength of PLANO-T (Bausch & Lomb Japan).
Figure 7:
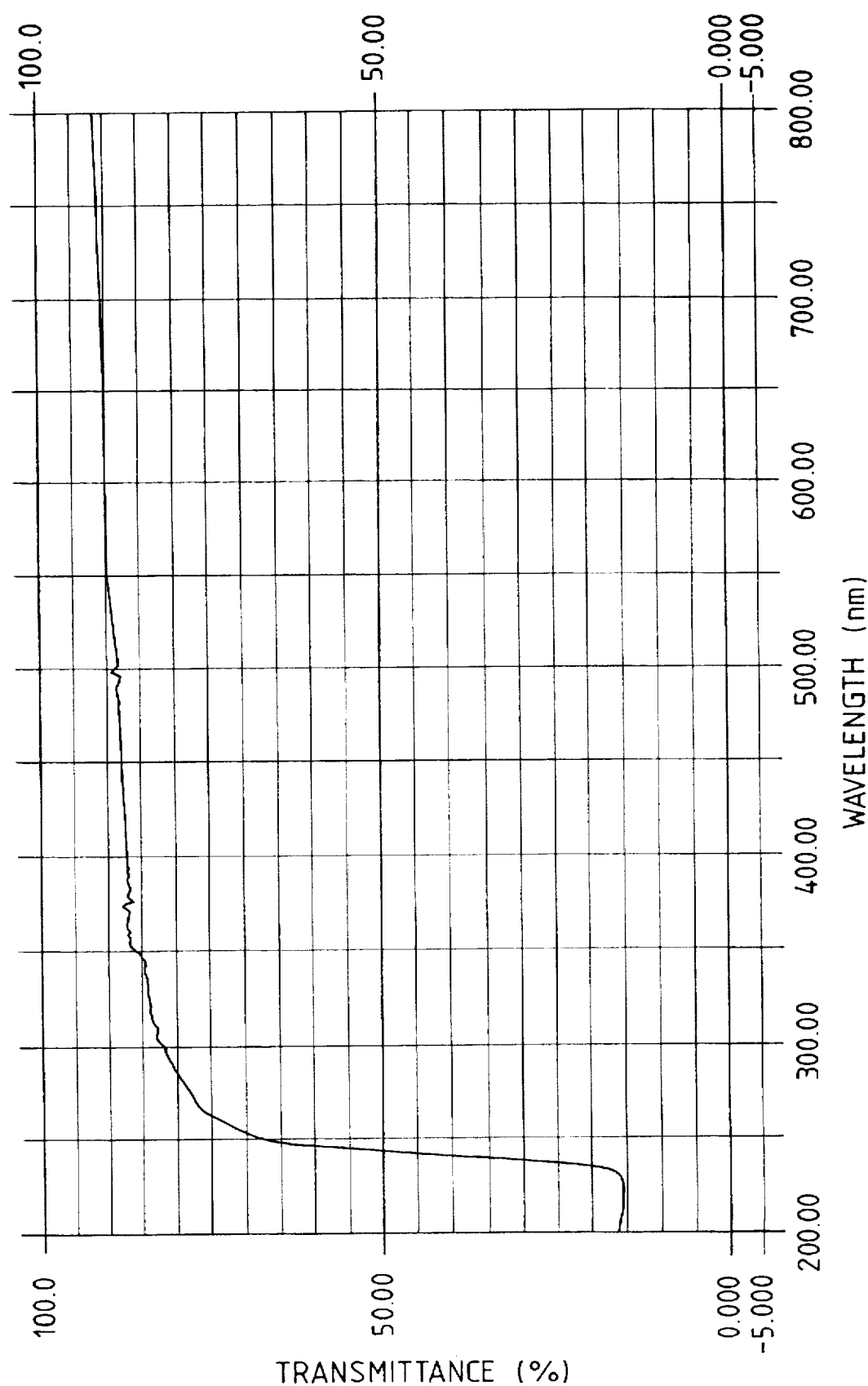
FIG. 7 is a graph showing the relationship between transmittance and wavelength of SeeQuence (Bausch & Lomb Japan).

Using Shimadzu Self-registering Spectrophotometer UV-2200 (manufactured by Shimadzu Corp.), the photocured crosslinked-hyaluronic acid contact lenses produced in Examples 1 and 2 and four commercially available contact lenses (Crystal Color Kuraray Co., Ltd., water content: 38.6%), Breth-O (Toray Industries, Inc., water content: 78%, material: polymer comprising methyl mehtacrylate and N-vinylpyrrolidone), PLANO-T (Bausch & Lomb Japan, water content: 39%, material: poly 2-hydroxyethyl methacrylate), SeeQuence (Bausch & Lomb Japan, water content: 38.6%, material: poly 2-hydroxyethyl methacrylate)) were checked for their transmittance of light at a wavelength region of 200 to 800 nm. The results are shown as wavelength-transmittance charts in FIGS. 2 and 3 (Examples 1 and 2) and FIGS. 4 to 7 (commercial products).

As shown in these drawings, the photocured crosslinked-hyaluronic acid contact lenses of the present invention have apparently high absorption rate of light at the ultraviolet region (300 to 200 nm) which exerts bad influences upon the eye, in comparison with the four commercial products.

Particularly, at around 280 nm, the photocured crosslinked-hyaluronic acid contact lens of Example 1 (DS 1.21%, FIG. 2) absorbed 85% or more of ultraviolet rays under wet conditions, and even the low DS contact lens of Example 2 (DS 0.53%, FIG. 3) absorbed 35% or more of ultraviolet rays under wet conditions.

EXAMPLE 4

Measurement of oxygen permeability coefficient of photocured crosslinked-hyaluronic acid contact lens Oxygen permeability coefficient of the photocured crosslinked-hyaluronic acid contact lens prepared in Example 1 was measured by an electrode method.

4-1: Materials and method

1. Test sample

Three pieces of the photocured crosslinked-hyaluronic acid contact lenses prepared in Example 1 were used. Until measurement, the lenses were preserved in physiological saline. The thickness of the photocured crosslinked-hyaluronic acid contact lens (DS 1.21%) was adjusted to 0.2 mm.

As the commercially available soft contact lens, contact lens of Bausch & Lomb PLANO-T (central thickness: 0.18 mm, water content: 39%) was used as a control.

2. Method of measurement

The photocured crosslinked-hyaluronic acid contact lens was set in a measurement chamber, and measured at 35° C. by an electrode method. In the measurement, an improved device for contact lens consisting of a dissolved oxygen meter (DU-25A type, TOA Electronics Ltd.) and an electrode (OE-2111 type, TOA Electronics Ltd.) was used.

4-2: Results

Measurement results obtained are shown in Table 3.

The oxygen permeability coefficient of the photocured crosslinked-hyaluronic acid contact lens with high water content was about 7 times as that of PLANO-T.

TABLE 3

| Number of test sample | Water content (%) | Oxygen permeability coefficient ($\times 10^{-11}$ (cm$^2$/sec) · (ml O$_2$/ml · mmHg)) |
| --- | --- | --- |
| No. 1 | 81 | 68.5 |
| No. 2 | 81 | 69.5 |
| No. 3 | 82 | 71.2 |
| Mean value | 81.3 | 69.7 |
| Standard deviation | 0.577 | 1.37 |
| PLANO-T | 39 | 9.7 |

EXAMPLE 5

Wearing test of photocured crosslinked-hyaluronic acid contact lens

Wearing performance and eye irritation of the photocured crosslinked-hyaluronic acid contact lens prepared in Example 1 were examined using rabbit eyes.

5-1: Materials and method (1) Animal:

Four rabbits (JW line, female, Conv. grade) of about 4 kg in body weight were used.

(2) Test sample:

A total of 8 pieces of the photocured crosslinked-hyaluronic acid contact lens prepared in Example 1 were used. They were preserved in physiological saline until their use.

(3) Wearing of photocured crosslinked-hyaluronic acid contact lens:

Under general anesthesia by intravenous injection of 5 mg/kg of ketamine hydrochloride (Ketalar) and 2 mg/kg of xylazine hydrochloride (Seractar), the aforementioned contact lens was worn on the eye in such a manner that it fitted to the cornea. In order to prevent rubbing of rabbits'eyes, Elizabeth collar was attached to the neck of each animal, and they were observed for 2 days. Thereafter, Elizabeth collar was detached and the observation was continued for 4 days (6 days in total). The observation was carried out every afternoon.

(4) Items observed:

Observation was made about the presence of falling off of the contact lens and, when not fallen, position of the contact lens in the eyelid and the presence of irritation.

5-2: Results and discussion

Results of the wearing and irritation tests are shown in Table 4.

TABLE 4

| | | Results of wearing and irritation tests | | | | | | | |
| --- | --- | --- | --- | --- | --- | --- | --- | --- | --- |
| | | Animal No. | | | | | | | |
| | | No. 1 | | No. 2 | | No. 3 | | No. 4 | |
| Day | Eyes*1 | R | L | R | L | R | L | R | L |
| 1 | Fitness*2 | p.f. | float | cut | float | p.f. | p.f. | fit | fit |
| | Lens*3 | yes | yes | yes | yes | yes | yes | yes | yes |
| | Irritation | no | no | tears | tears | no | no | no | no |
| 2 | Lens | yes | yes | yes | yes | yes | yes | yes | yes |
| | Irritation | no | no | tears | tears | no | no | no | no |
| 3 | Lens | yes | yes | yes | yes | yes | yes | yes | yes |
| | Irritation | no | no | tears | tears | no | no | no | no |
| 4 | Lens | yes | yes | yes | yes | yes | yes | yes | yes |
| | Irritation | no | no | tears | no | no | no | no | no |
| 5 | Lens | yes | yes | no | yes | yes | yes | yes | yes |
| | Irritation | no | mucus*4 | — | — | no | no | no | no |
| 6 | Lens | yes | yes | — | no | yes | yes | no | yes |
| | Irritation | no | no | — | — | no | no | — | no |

*1: R: right eye; L: left eye
*2: Fitness when worn (p.f.: perfectly fit; float: the edge slightly floating; cut: a cut line formed)
*3: Presence of lens
*4: Eye mucus formed Wearing performance of the photocured crosslinked-hyaluronic acid contact lens was excellent, with no falling off of the lens after 4 days and only one case of falling off after 5 days in which a cut line was formed at the time of the insertion of lens. Two more lenses were fallen off after 6 days of the wearing. In consequence, wearing period of the contact lens examined this time seems to 5 days at the most, but it is possible to prolong the wearing period by improving its compatibility with the cornea. In addition, though irritation was observed in one eye, this was considered to be due to breakage of the membrane or irritation caused by the floating of the edge of the lens, so that it seemed that no irritation would occur if the contact lens had a perfectly fitted shape.

EXAMPLE 6

Examination of sustained drug release effect of photocured crosslinked-hyaluronic acid contact lens In order to examine usefulness of the photocured crosslinked-hyaluronic acid contact lens prepared in Example 1 as a sustained drug-releasing base material, the contact lens after impregnation with a mydriatic preparation, Mydrin P (trade name, manufactured by Santen Pharmaceutical), was worn on the rabbit eye to compare duration of its mydriatic effect with that of an eye lotion. Mydrin P is a drug which contains tropicamide having parasympatholytic action and phenylephrine hydrochloride having sympathomimetic action and causes mydriasis by the pupillary sphincter relaxing action of tropicamide and the pupillary dilator contracting action of phenylephrine hydrochloride. It also contains epsilon-aminocaproic acid, benzalkonium chloride, chlorobutanol, boric acid and the like antiseptics.

6-1: Materials and methods (1) Photocured crosslinked-hyaluronic acid contact lens:

The photocured crosslinked-hyaluronic acid contact lens prepared in Example 1 was used.

(2) Experimental animal:

A total of 12 female rabbits of JW line (body weight, 2.79 to 3.22 kg) were used.

(3) Mydriatics:

A mydriatic preparation was selected as a drug for use in the examination of sustained release effect, because its sustained release effect can be examined easily by periodically measuring pupil diameter. The mydriatic preparation, Mydrin P, is a colorless or slightly yellow and transparent water soluble eye lotion which contains 0.5% of tropicamide (molecular weight, 284) and 0.5% of phenylephrine hydrochloride (molecular weight, 204) and is used in mydriasis for diagnosis and therapeutic purposes and in accommodation paralysis.

(4) Preparation of photocured crosslinked-hyaluronic acid contact lens containing Mydrin P:

Each sample of the photocured crosslinked-hyaluronic acid contact lens was soaked in 1 ml of Mydrin P (tropicamide-phenylephrine eye lotion) for 20 hours, and excess liquid was drained when used.

(5) Wearing of Mydrin P-containing photocured crosslinked-hyaluronic acid contact lens:

Under general anesthesia by intravenous injection of 5 mg/kg of ketamine hydrochloride (Ketalar) and 2 mg/kg of xylazine hydrochloride (Seractar), narrowing of pupil was confirmed by shining on the eye with a hand slit lamp (Nights) and the anterior eye portion was photographed. The Mydrin P-containing photocured crosslinked-hyaluronic acid contact lens was worn on one eye in such a manner that it fitted to the cornea, and used as a contact lens group. In an eye lotion group, one drop (50 µl) of Mydrin P was applied in one eye. Not both eyes, but only one eye of each individual was used. Six rabbits were used in one group.

(6) Observation:

Under general anesthesia, each anterior eye portion was observed by fixing each rabbit on a fixing apparatus. The eye was shone with a hand slit lamp to observe changes in the pupil diameter, position of the contact lens and irritation and then the anterior eye portion was photographed. The photographs were taken just before wearing of the contact lens or application of the eye lotion and 1 and 20 hours thereafter.

(7) Measurement of pupil diameter:

Pupil diameter in the major axis direction was measured from the photograph. Pupil diameters measured after 1 and 20 hours wearing of the contact lens or application of the eye lotion were compared to be used as the index of sustained drug release effect.

6-2: Results
Pupil diameters are shown in Table 5.

TABLE 5

Pupil diameters at the time of application of Mydrin P and wearing of Mydrin P-containing photocured crosslinked-hyaluronic acid contact lens

| Group | Just before (mm) | After 1 hr (mm) | After 20 hrs (mm) |
| --- | --- | --- | --- |
| Eye lotion | 2.55 ± 0.412 | 10.6 ± 0.863*** | 4.12 ± 0.690** |
| Contact lens | 2.50 ± 0.354 | 11.3 ± 0.413*** | 7.73 ± 0.569***,$$$ |

Each of the data is shown in average value ± standard deviation of 6 eyes.
The mark * means a result of t-test between 2 samples having correspondence with the value just before application of the eye lotion or wearing of the lens.
**$p < 0.01$;
***$p < 0.001$
The mark $ means a result of t-test between 2 samples having no correspondence between groups at the time of each measurement.
$$$$p < 0.001$ In both cases of the eye lotion group and contact lens group, a pupil diameter of 10 mm or more was measured after 1 hour of the treatment, which was close to the maximum mydriasis. Even after 20 hours of the treatment, the pupil diameter was significantly larger than the value just before the treatment. When pupil diameter of the eye lotion group was compared with that of the contact lens group, significant differences were not observed just before and 1 hour after the treatment, but pupil diameter in the contact lens group after 20 hours was significantly large in comparison with the eye lotion group.

Wearing conditions of the Mydrin P-containing photocured crosslinked-hyaluronic acid contact lens were excellent, and its movement was not observed. However, slight iris hyperemia and corneal opacity were observed.

6-3: Discussion

In order to examine usefulness of the photocured crosslinked-hyaluronic acid contact lens of the present invention as a sustained drug releasing base material, the contact lens was impregnated with a mydriatic preparation, Mydrin P, worn on the rabbit eye and its mydriasis effect was compared with a case of the application of an eye lotion. The mydriasis condition was maintained after 20 hours in both groups, but the pupil diameter in the contact lens group was significantly larger than that in the eye lotion-applied group. Also, since no irritation was observed in the wearing test on normal eyes (Example 5), the iris hyperemia and corneal opacity observed in this case were considered to be due to the nervous action or additive agents of Mydrin P. In consequence, it was considered that the photocured crosslinked-hyaluronic acid contact lens was fully useful as a base material for use in the sustained release of drugs.

Thus, as has been described in the foregoing, a photocured crosslinked-hyaluronic acid contact lens having markedly low DS value can be obtained because of the use of a raw material prepared by using hyaluronic acid that exists in a living body such as animal tissues and the like including human as the main constituent material, binding thereto a spacer group-introduced photoreactive crosslinking group and photocrosslinking the resulting product, so that the present invention can provide a contact lens which is possessed of the intrinsic characteristic features of hyaluronic acid such as tissue affinity, biocompatibility and bioaffinity, high water holding property, and high oxygen permeability, can find versatile use in such applications as a visual acuity correcting contact lens, a therapeutic contact lens, a cornea protecting material, a sustained drug releasing contact lens, an ultraviolet ray protecting contact lens and the like according to use purposes.

While the invention has been described in detail and with reference to specific embodiments thereof, it will be apparent to one skilled in the art that various changes and modifications can be made therein without departing from the spirit and scope thereof.

What is claimed is:

1. A photocured crosslinked-hyaluronic acid contact lens which comprises a photocured crosslinked-hyaluronic acid derivative produced by the formation of a crosslinked cyclobutane ring by light irradiation from mutual photoreactive crosslinking groups of a photoreactive hyaluronic acid derivative in which said photoreactive crosslinking groups are linked to hyaluronic acid, wherein said photoreactive crosslinking groups are introduced into functional groups of hyaluronic acid via a spacer, and said contact lens has a water content of 80 to 99% and shape compatibility and tissue affinity for the eyeball.

2. The photocured crosslinked-hyaluronic acid contact lens according to claim 1, wherein oxygen permeability coefficient (Dk value) of said contact lens is $40 \times 10^{-11}$ to $100 \times 10^{-11}$ (cm$^2$/sec)·(ml O$_2$/ml·mmHg).

3. The photocured crosslinked-hyaluronic acid contact lens according to claim 1, wherein said photoreactive crosslinking group is derived from cinnamic acid or a derivative thereof;

said photoreactive hyaluronic acid derivative is formed by introducing the photoreactive crosslinking group into hyaluronic acid through binding of a functional group of hyaluronic acid with a photoreactive crosslinking group-linked spacer group in which said photoreactive crosslinking and one functional group of a spacer compound having at least two functional groups are linked together;

the functional of the spacer to be linked to hyaluronic acid is an amino group; and the photoreactive crosslinking group-linked spacer is introduced into hyaluronic acid to form said photoreactive hyaluronic acid derivative by forming an amide bond with a carboxyl group of hyaluronic acid.

4. A photocured crosslinked-hyaluronic acid contact lens which comprises a photocured crosslinked-hyaluronic acid derivative produced by the formulation of a crosslinked cyclobutane ring by light irradiation from mutual photoreactive crosslinking groups of a photoreactive hyaluronic acid derivative in which said photoreactive crosslinking groups are linked to hyaluronic acid, wherein said photoreactive crosslinking groups are introduced into functional groups of hyaluronic acid via a spacer wherein said spacer is an amino alcohol and said contact lens has a water content of 80 to 99% and shape compatibility and tissue affinity for the eyeball.

5. The photocured crosslinked-hyaluronic acid contact lens according to claim 4, wherein said amino alcohol is selected from the group consisting of aminoethanol, aminopropanol, aminobutanol, aminopentanol, aminohexanol, aminooctanol and aminododecanol.

6. The photocured crosslinked-hyaluronic acid contact lens according to claim 1, wherein said photoreactive crosslinking group is introduced into hyaluronic acid to form said photoreactive hyaluronic acid derivative in an average ratio of from 0.2 to 5 mole % per constituent disaccharide unit of said hyaluronic acid.

7. The photocured crosslinked-hyaluronic acid contact lens according to any one of claims 1 to 6, which has a cornea protecting effect.

8. The photocured crosslinked-hyaluronic acid contact lens according to any one of claims 1 to 6, which absorbs and cuts ultraviolet rays which are harmful to the eye.

9. The photocured crosslinked-hyaluronic acid contact lens according to any one of claims 1 to 6, wherein a physiologically useful and active substance is included in the lens, and said substance is gradually released during wearing of the lens.

10. The photocured crosslinked-hyaluronic acid contact lens according to any one of claims 1 to 6, which has a visual acuity-correcting effect.

11. A process for preparing a photocured crosslinked-hyaluronic acid contact lens which comprises molding the photoreactive hyaluronic acid derivative according to claim 1 into a shape that fits to the eyeball, and subsequently irradiating the shaped product with light to effect crosslinking between the mutual photoreactive crosslinking groups of said photoreactive hyaluronic acid derivative.

12. The photocured crosslinked-hyaluronic acid contact lens according claim 1, wherein said spacer comprises two reactive functional groups.

13. The photocured crosslinked-hyaluronic acid contact lens according to claim 12, wherein said two functional groups comprise an amino group and a hydroxyl group; an amino group and a carboxyl group; a carboxyl group and a hydroxyl group; two amino groups; or two hydroxyl groups.

14. The photocured crosslinked-hyaluronic acid contact lens according to claim 1, wherein said spacer is selected from the group consisting of an amino acid or derivative thereof, a peptide, an amino alcohol, a diamine, an oligosaccharide, a diol and a hydroxy acid.

15. The photocured crosslinked-hyaluronic acid contact lens according to claim 1, wherein said photoreactive crosslinking groups are derived from cinnamic acid or derivatives thereof, 1-carboxyalkylthymine, or 7-coumaryloxyacetic acid.

* * * * *

UNITED STATES PATENT AND TRADEMARK OFFICE
CERTIFICATE OF CORRECTION

PATENT NO. : 5,789,462
DATED : August 4, 1998
INVENTOR(S) : Yoshihiro Motani, et al.

It is certified that error appears in the above-identified patent and that said Letters Patent is hereby corrected as shown below:

Claim 13, line 2 (column 20, line 39), after "two" insert --reactive--.

Signed and Sealed this

Twenty-third Day of March, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT NO. : 5,789,462
DATED : August 4, 1998
INVENTOR(S) : Yoshihiro Motani, et al It is certified that error appears in the above-identified patent and that said Letters Patent is hereby corrected as shown below:

Claim 3, line 9, after "spacer", delete "group";
Claim 3, line 10, insert --group-- after "crosslinking";
Claim 3, line 13, insert --group-- after "functional".

Signed and Sealed this

Seventh Day of September, 1999

Attest:

Q. TODD DICKINSON

Attesting Officer

Acting Commissioner of Patents and Trademarks